H. A. STEMMER.
EVAPORATING PAN AND HOLDER.
APPLICATION FILED MAY 25, 1908.

907,195.

Patented Dec. 22, 1908.

Witnesses

Inventor
Henry A. Stemmer
By Geo. S. Vashon
Attorney

UNITED STATES PATENT OFFICE.

HENRY A. STEMMER, OF ST. LOUIS, MISSOURI.

EVAPORATING-PAN AND HOLDER.

No. 907,195.

Specification of Letters Patent.

Patented Dec. 22, 1908.

Application filed May 25, 1908. Serial No. 434,800.

*To all whom it may concern:*

Be it known that I, HENRY A. STEMMER, a citizen of the United States, residing at St. Louis, State of Missouri, have invented new and useful Improvements in Evaporating-Pans and Holders, of which the following is a specification.

This invention relates to air moisteners of the type that are connected to the grating bars of open fire places, hot air registers, and the like, in which the evaporation of the water in the pans tends to overcome the injurious effects which result from the admission of dry hot air into a room; and one of the principal objects of the invention is to make such a holder of a form that it can be readily attached to or disconnected from a grating, hot air register, or the like, and also to provide the same with a portion in which the evaporating pan may be snugly and removably seated.

In carrying out the object stated above it is contemplated providing a holder with a closed front and bottom portion and an open back portion carrying attaching hooks, and in combining with such holder a water pan which is of the same contour as the holder and in which it is to be snugly seated, the arrangement being such that when the holder is attached to a grated heat outlet from the fire, the heat will enter through the open back of the said holder and act directly upon the pan to cause the contents thereof to moisten the hot air admitted to the room.

In the practical use of the holder and pan, structural changes may be resorted to, a preferred embodiment of which is shown in the accompanying drawings, in which—

Figure 1:
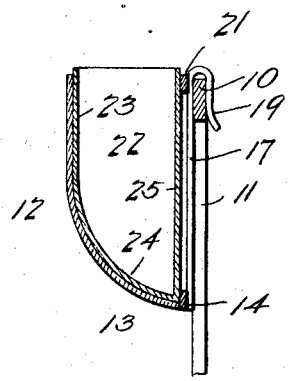
Figure 2:
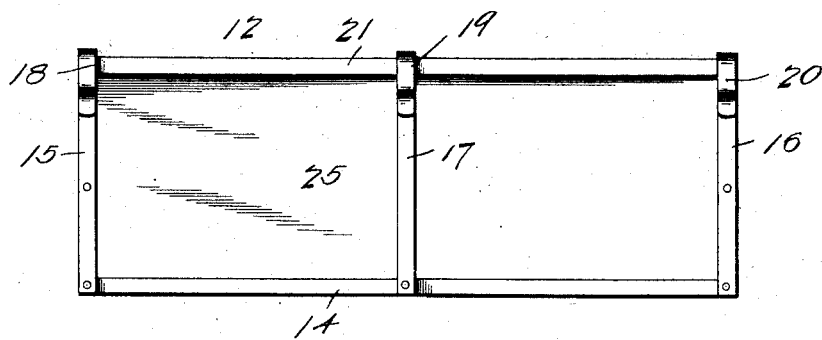

Figure 1 is a sectional view of the holder and pan showing the same attached to a grating. Fig. 2 is a rear view of the same detached.

Like characters of reference designate corresponding parts.

In the following description and in the accompanying drawings the invention has been shown and described as used in connection with the front grate bars of a fire place grating, but it will of course be understood that the same may be used in connection with registers and similar devices that are usually placed over the heat openings of flues.

In the accompanying drawings the invention has been shown attached to an upper horizontal bar 10 of a front grating 11. The improved pan holder 12 is of a substantially rectangular shape and has an inwardly curving bottom 13 the lower edge of which is connected with a bottom horizontal strip 14 which carries at each end and at its center vertical attaching strips 15, 16 and 17, respectively, which are formed of thin, resilient metal and have their upper ends bent over to form spring hooks 18, 19 and 20, which engage with, and support the holder on the said grating. An upper horizontal strip 21 connects the upper portion of each vertical strip, which, in connection with said vertical strips and the bottom horizontal strip, forms an open back for the holder to permit of the heat having access thereto and have direct action on the water pan 22. The said water pan 22 is preferably of the shape shown in Fig. 1 of the drawings, comprising a front 23 the lower portion of which is inwardly curved to form a bottom 24 which is connected to the straight back 25.

In assembling the invention, the pan 22 is filled with water and dropped into the holder, causing the same to assume the relative position shown in Fig. 1. The spring hooks are then placed over the horizontal bar of the fireplace grating, and owing to the fact that the back of the holder is open, the heat from the fire place will have direct action on the water pan, causing a gradual evaporation of the water therein which evaporation, moistens and purifies the hot air in a manner such as is well known and understood.

What I claim is:

1. In a device of the character described, a pan holder provided with an open back for the admission of heat and carrying spring hooks for detachably connecting the same with a fire grating, an evaporating pan seated in said holder and heated by the heating agent entering the same through the open back.

2. In a device of the character described a pan holder provided with a rounded bottom portion and an open back portion formed of upper and lower horizontal strips and connecting vertical strips the upper ends of which are bent over to form attaching hooks, and a pan of the same contour as the pan holder and adapted to be seated therein.

In testimony whereof, I affix my signature in presence of two witnesses.

HENRY A. STEMMER.

Witnesses:
GEO. W. MURRAY,
M. CURRY GILES.